(No Model.) 2 Sheets—Sheet 2.
J. LINNROTT.
CORN PLANTER.
No. 277,495. Patented May 15, 1883.
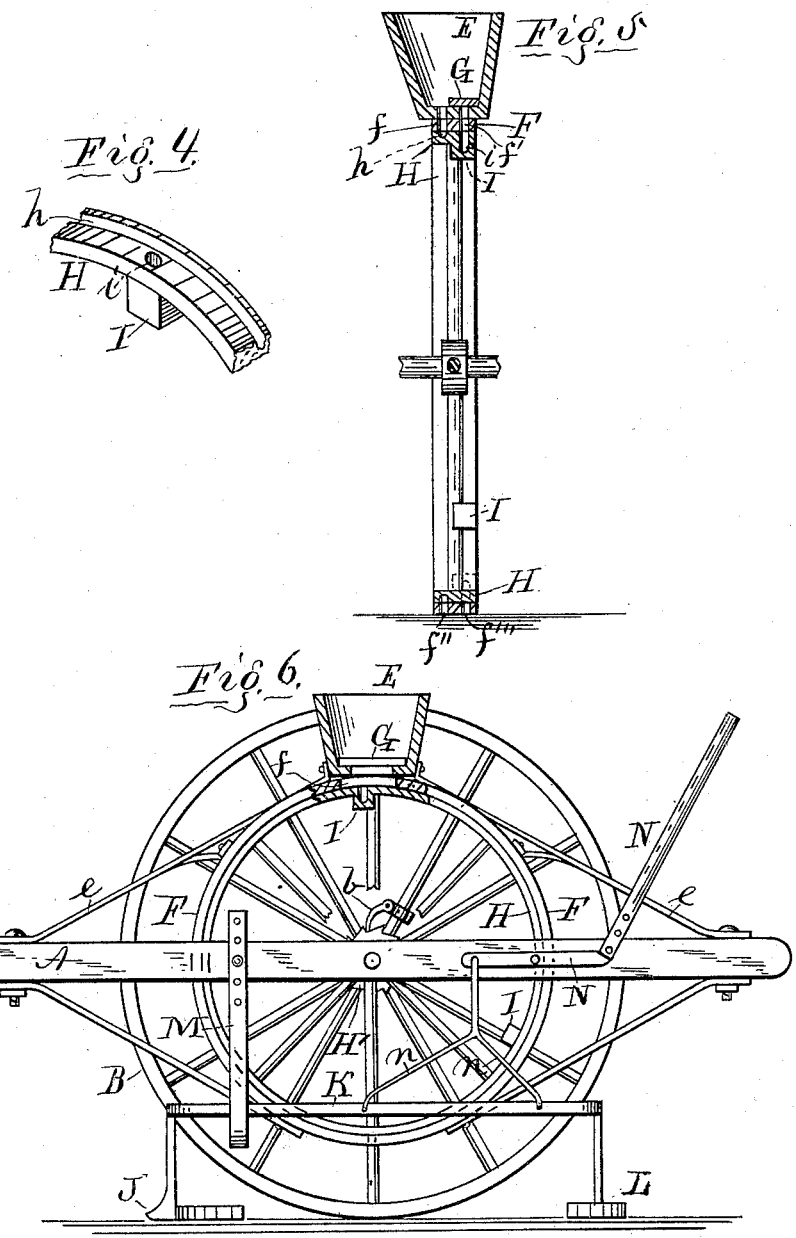
Witnesses:
S. R. Richards
F. B. Benner
Inventor:
Joseph Linrott
By W. B. Richards,
his Atty.

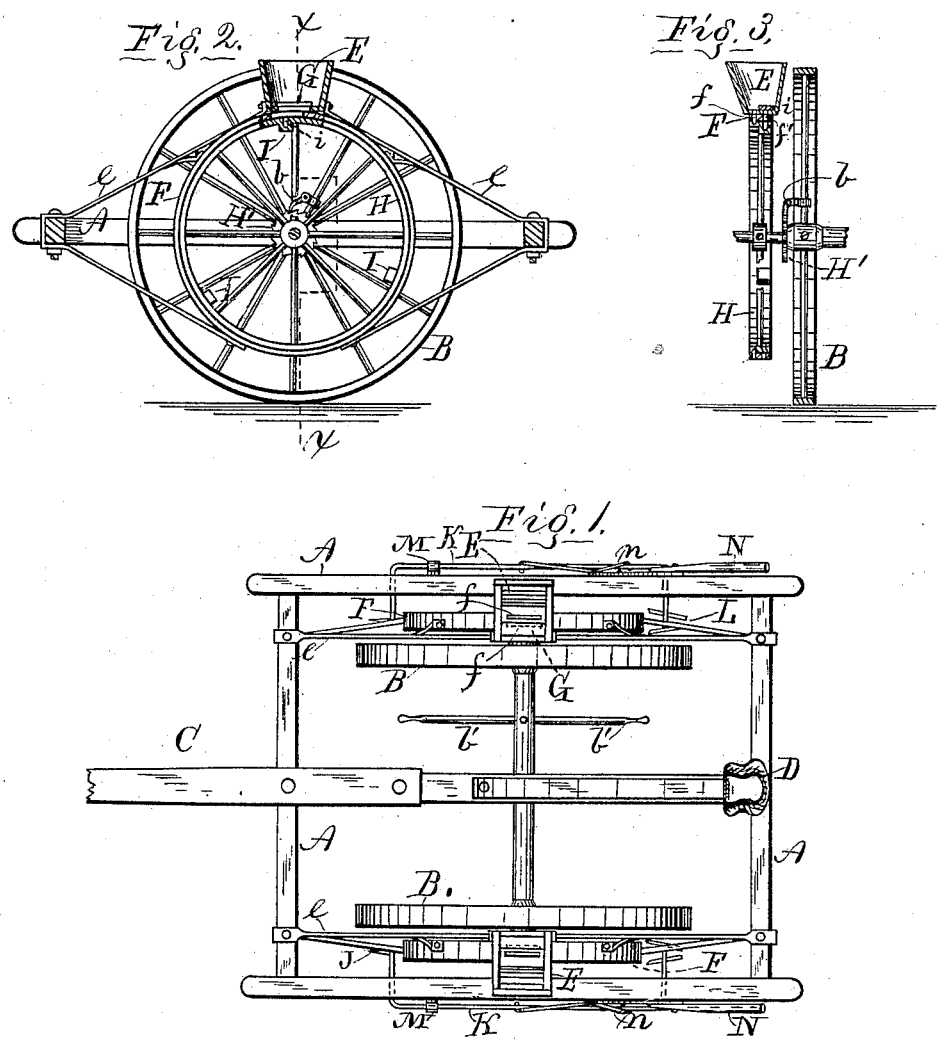

UNITED STATES PATENT OFFICE.

JOSEPH LINNROTT, OF GALESBURG, ILLINOIS.

CORN-PLANTER.

SPECIFICATION forming part of Letters Patent No. 277,495, dated May 15, 1883.

Application filed July 31, 1882. (No model.)

*To all whom it may concern:*

Be it known that I, JOSEPH LINNROTT, a citizen of Sweden, residing at Galesburg, in the county of Knox and State of Illinois, have invented certain new and useful Improvements in Corn-Planters; and I do hereby declare the following to be a full, clear, and exact description of the invention, such as will enable others skilled in the art to which it appertains to make and use the same.

My invention relates to corn-planters of the automatic check-row class; and it consists in constructions and combinations hereinafter described, and set forth in the claims hereto annexed.

In the accompanying drawings, which illustrate my invention, Figure 1 is a top plan. Fig. 2 is a side elevation of a supporting-wheel and seed-dropping device, partly in section. Fig. 3 is a sectional elevation of the seed-box, supporting-wheel, seed-cup wheel, and seed-retaining wheel in line $x\,x$ in Fig. 2. Fig. 4 is an enlarged perspective of a segment of the seed-cup wheel. Fig. 5 is an enlarged sectional elevation of the seed-dropping devices. Fig. 6 is an enlarged side elevation, partly in section.

Referring to the drawings by letters, the same letter indicating the same part in the different figures, letter A represents the frame of a corn-planter, which may be constructed in any ordinary well-known or desired manner; A', the shaft, loosely journaled in the frame.

B are the supporting-wheels, loosely journaled upon their shaft; C, the draft-pole, and D the driver's seat.

E are the seed-boxes, supported by any suitable bars, $e$, on the frame A.

On each side of the frame A, and immediately beneath each seed-box, an annular plate or ring, F, is supported by rigid attachment to the frame A. The ring F has an enlarged opening, $f$, in its upper side, immediately under the seed-box, and another similar opening, $f'$, adjacent, and has an opening, $f'''$, in its lower side, directly beneath the opening $f$, and an opening, $f''''$, adjacent to the opening $f'''$, and directly beneath the opening $f'$. A cover or cap, G, is adapted to cover either opening $f\,f'$, as required, and for purposes hereinafter explained.

Interior to and fitting snugly within the fixed annular plate F is a ring or wheel, H, which may be a disk, or may be formed, as shown, of a rim, spokes, and hub. The wheels H are fixed on the axle of the wheels B, and each has a ratchet-wheel, H', fixed thereto, or fixed to the axle, with which a pawl, $b$, on its adjacent wheel B engages when the wheel B rotates forward, and thus gives motion to the wheels H. Either wheel B may turn backward in turning the planter, and for other purposes, without moving the wheels H. Arms $b'$ project from the axle, which may be taken hold of by the driver to rotate the axle, and thereby rotate or move the wheels H, as required, in starting in at the ends of rows, or at other times where necessary to align the dropping devices with the transverse rows of dropped seed. The wheel H has a circumferential groove, $h$, in its exterior surface, immediately beneath the opening $f$, and coincident with the opening $f''$. When the cap G is placed over the opening $f'$, the seed in the box E will pass through the opening $f$ and into the groove $h$, and will be retained therein by the ring F, and passing downward by the rotation of the wheel H will be discharged through the opening $f''$ into the ground, and in what is usually known as "drilled planting."

I I I are enlargements in the rim of the wheel H, and each enlargement contains a pocket or seed-cup, $i$, in its exterior surface. The pockets $i$, in the rotation of the wheel H, pass beneath and coincident with the opening $f'$, and are thereby filled with seed, each in a quantity sufficient for a "hill" of corn. Each charge of seed in a pocket $i$ is retained therein by the fixed ring F until it reaches the opening $f''''$, where it is discharged near the surface of the ground. The distance between the pockets $i$ will of course regulate the distance between the hills or transverse rows of corn, and the check-row planting be effected in the evident manner. While using the machine for check-row planting, as last described, the plate G is placed over the opening $f'$.

J is a furrow-opener projecting downwardly from the front end of a bar, K, in front of the ring F.

L is a seed-covering share projecting downwardly from the rear end of the bar K, in rear of the ring F. The bar K is carried in a slotted pendant, M, and may be raised and lowered by means of a bent lever, N, and rods n in the evident manner.

I am aware that an annular plate or ring having openings coinciding with the groove and seed-cups of a wheel inclosed with the annular plate or ring, so that the seed passing through the upper openings in the said plate or ring to the inclosed wheel will be carried by the latter to the lower openings of said plate or ring and dropped, is old, and to that I make no claim; but

What I claim as new, and desire to secure by Letters Patent, is—

1. In a corn-planter, the combination of a shaft loosely journaled in the frame, and having a wheel, H, and a ratchet-wheel, H', fixed thereon, supporting-wheels B, loose upon the shaft, and having a pawl, b, which imparts motion to the shaft when in contact with wheel H' and the wheels B are moved, and an annular plate or ring, F, encircling the wheel H, and having openings for receiving and discharging corn from the seed-box E, and supported from the frame by the bars e, substantially as and for the purpose set forth.

2. In a corn-planter, the combination of a shaft loosely journaled in the frame, and having fixed thereon a wheel, H, provided with a circumferential groove, h, and seed-cups i, and a ratchet-wheel, H', supporting-wheels B, loose upon the shaft, and having a pawl, b, which imparts motion to the shaft when in contact with wheel H' and the wheels B are moved, and an annular plate or ring, F, encircling the wheel H, and having openings $f f'$, coinciding, respectively, with said groove h, and seed-cups i, and discharge-openings $f'' f'''$ at its lower side, and provided with a valve, G, adjustable to either opening, substantially as and for the purpose specified.

In testimony whereof I affix my signature in presence of two witnesses.

JOSEPH LINNROTT.

Witnesses:
SAML. W. GROSE,
E. D. AIKEN.